Aug. 26, 1947.  R. H. HILL  2,426,505
SERVOMOTOR
Filed Dec. 17, 1942  3 Sheets-Sheet 1
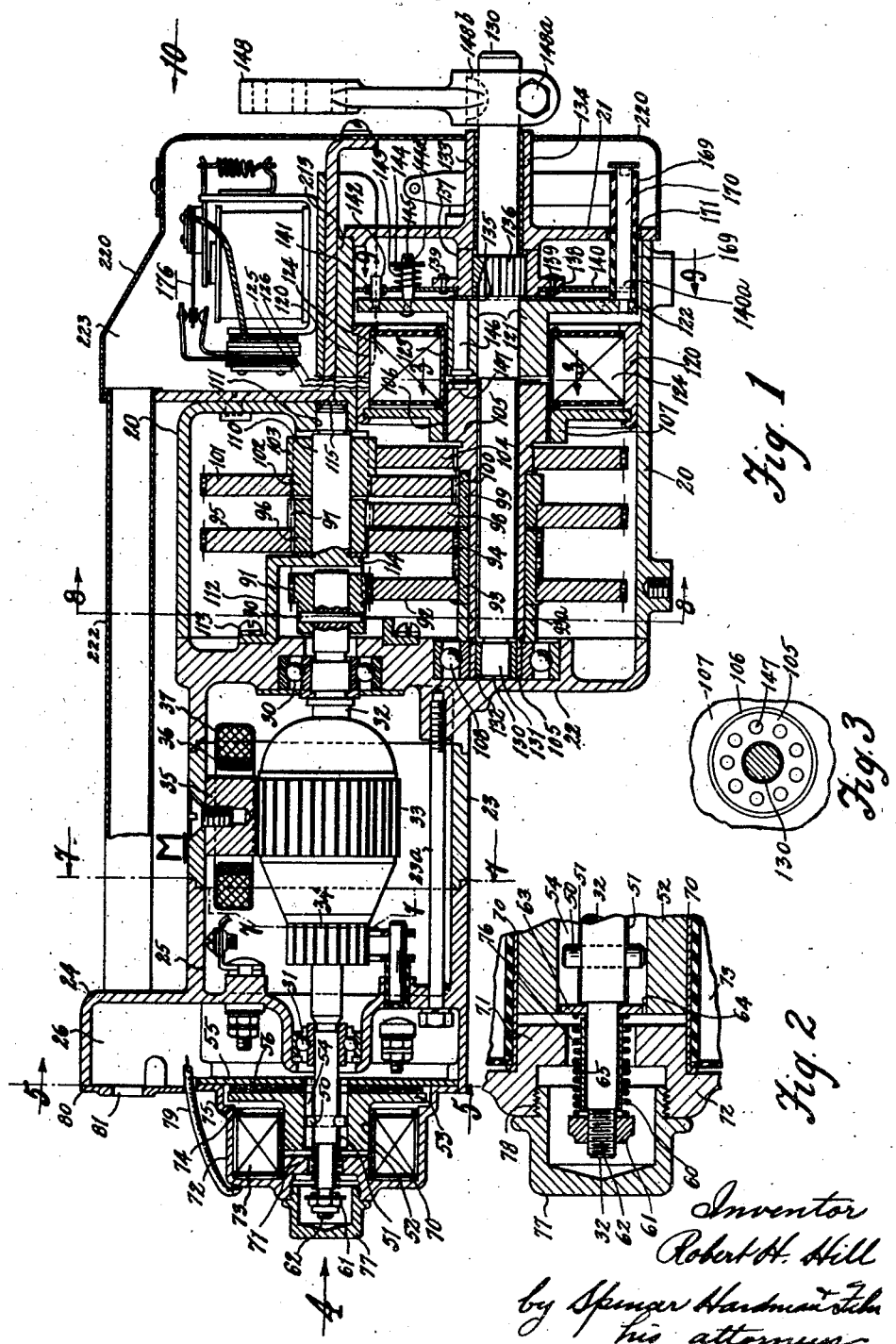

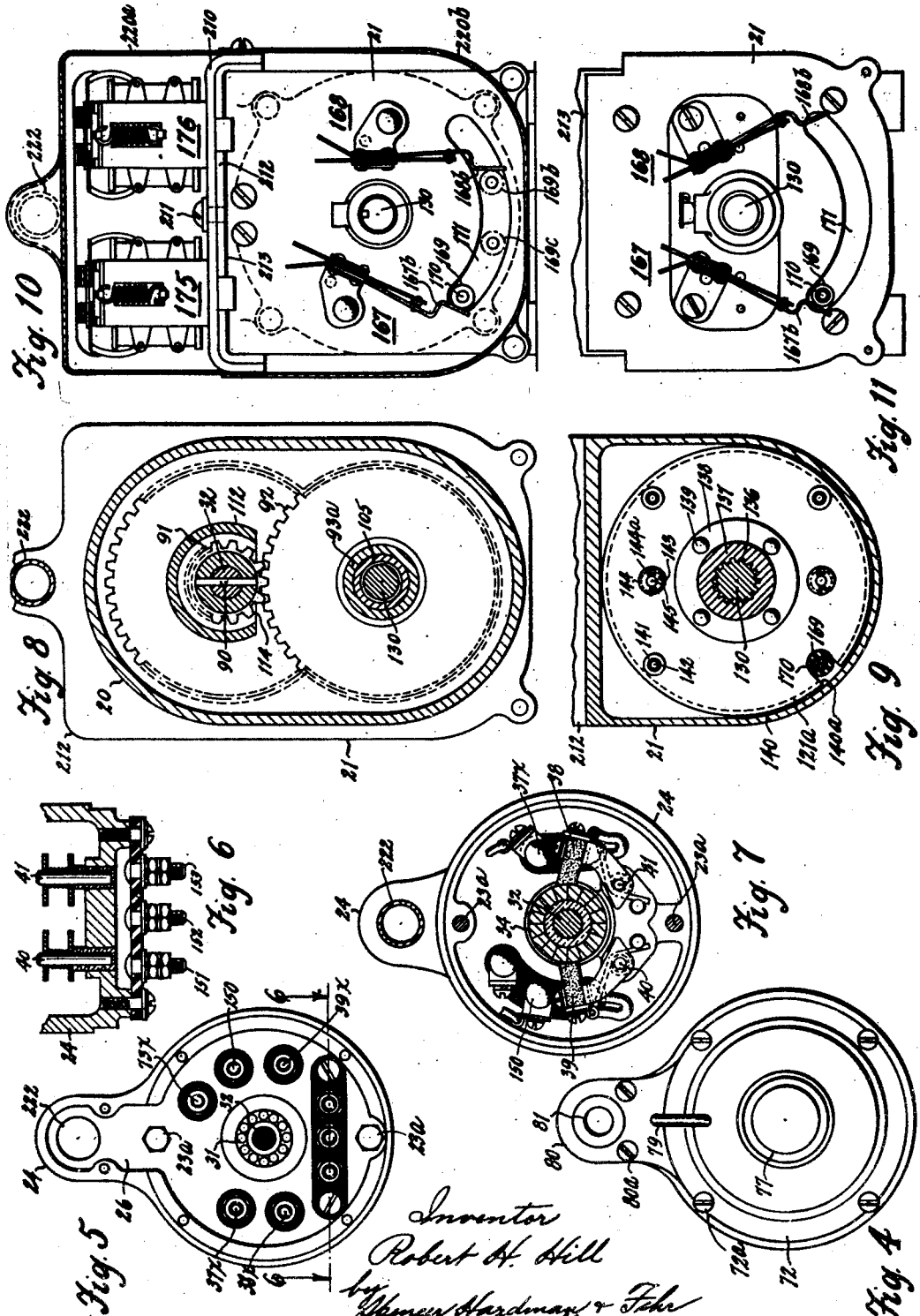

Patented Aug. 26, 1947

2,426,505

UNITED STATES PATENT OFFICE 2,426,505

SERVOMOTOR

Robert H. Hill, Anderson, Ind., assignor to General Motors Corporation, Detroit, Mich., a corporation of Delaware Application December 17, 1942, Serial No. 469,304

3 Claims. (Cl. 192—.02)

This invention relates to servo-mechanisms operated by electric motors whereby mechanical movements may be effected by remote control. For example, the present invention is concerned with servo-motors for operating the steering mechanism of an airplane.

It is an object of the present invention to provide a unitary structure comprising an electric motor, speed reducing gearing connecting the motor with a shaft which is connected by a magnetic clutch with an operating arm, relay switches for controlling the operation of the motor in a forward or reverse direction, limit switches for rendering the motor non-operative when the operating arm has moved a predetermined extent in either direction and means for braking the motor when the motor becomes non-operative.

Further objects and advantages of the present invention will be apparent from the following description, reference being had to the accompanying drawings wherein a preferred embodiment of the present invention is clearly shown.

In the drawings:

Fig. 1 is a longitudinal sectional view of a servomotor unit embodying the present invention.

Fig. 2 is a fragmentary view showing a portion of Fig. 1, on an enlarged scale.

Fig. 3 is a sectional view on line 3—3 of Fig. 1.

Fig. 4 is a left end view in the direction of arrow 4 of Fig. 1.

Fig. 5 is a view on line 5—5 of Fig. 1, the parts to the left on the line 5—5 having been removed.

Fig. 6 is a sectional view on the line 6—6 of Fig. 5.

Figs. 7, 8 and 9 are sectional views taken respectively on line 7—7, 8—8 and 9—9 of Fig. 1.

Fig. 10 is a right end view in the direction of the arrow 10 of Fig. 1, the end cover being shown in section.

Fig. 11 is a fragmentary right end view with the cover removed showing a modified arrangement of the limit switches.

Figure 12:
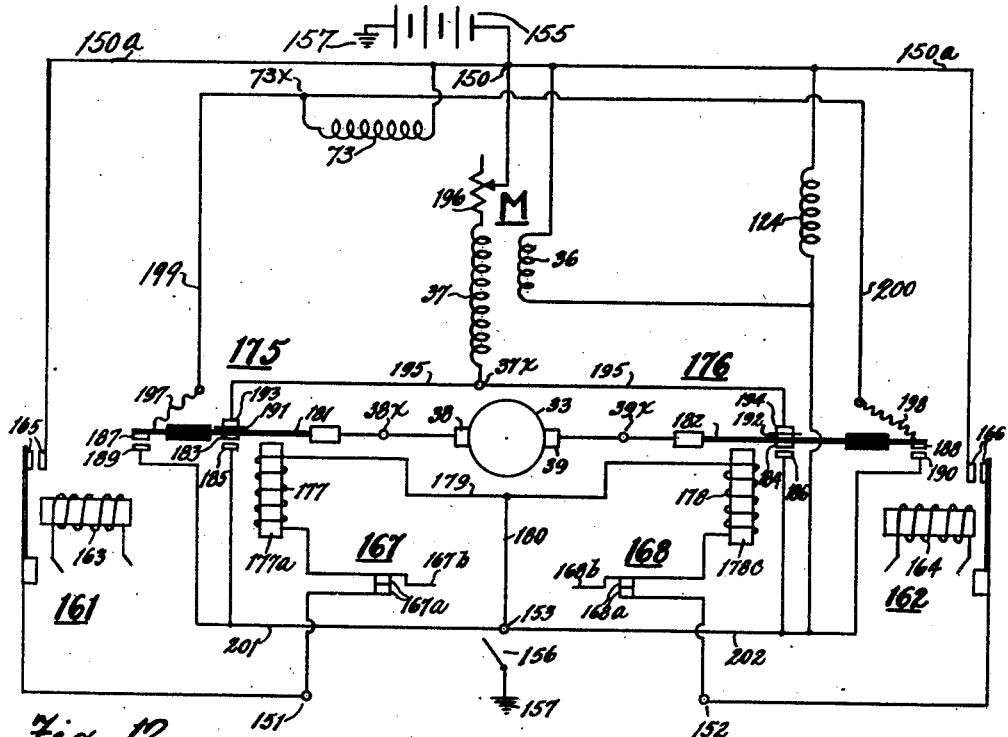
Figure 13:
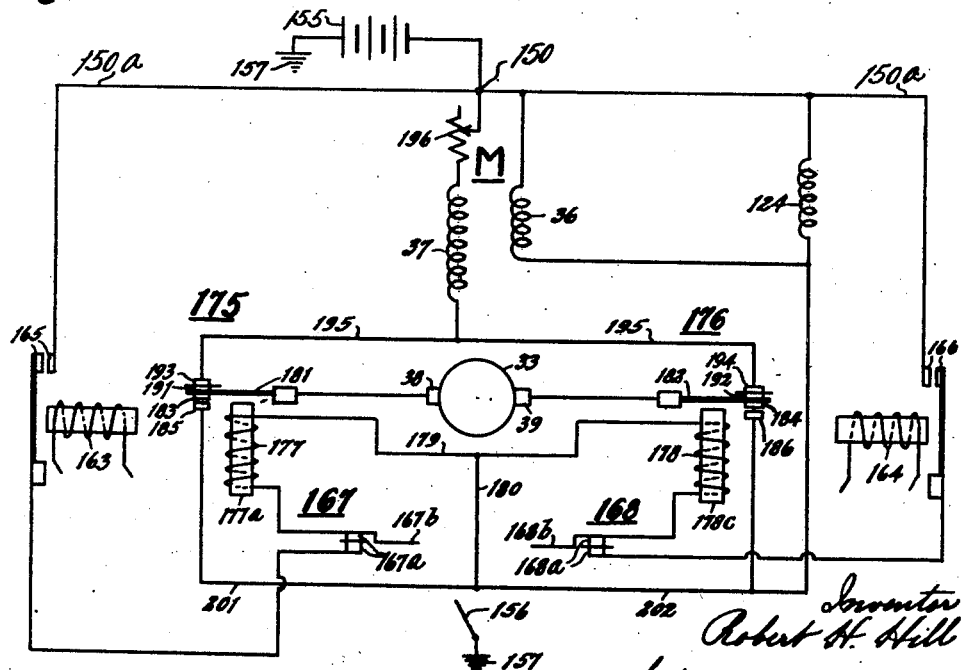

Figs. 12 and 13 are wiring diagrams.

The unit comprises a frame member 20 for enclosing speed reducing gearing and a magnetic clutch. Frame 20 is closed at its right end by a plate 21 for supporting limit switches. The left end of frame 20 is enclosed by a plate 22 which supports shaft bearings and which provides the right end wall of an electric motor M. Frame 22 provides the right end cover for a magnetizable field frame 23 associated with a left end cover provided by frame 24 which provides a chamber 25 for the commutator and brushes of the motor and a chamber 26 for enclosing terminal members connected with the motor field and armature circuits. The frame members 22 and 24 support bearings 30 and 31 for an armature shaft 32 supporting an armature 33 and a commutator 34. The armature revolves between pole pieces one of which is shown at 35. Each pole piece is surrounded by a winding assembly comprising a shunt field 36 of relatively fine wire and a series field 37 of relatively coarse wire. The commutator 34 is engaged by brushes 38 and 39 (Fig. 7) supported on studs 40 and 41 respectively insulatingly supported by the frame 24.

Near the left end thereof the armature shaft 32 carries a pin 50 which extends through a non-magnetizable sleeve 51 which slides through the central bore in the hub 52 of a brake disc 53. Hub 52 has longitudinal splines 54 receiving ends of the pin 50; and thus the pin 50 drivingly connects the shaft 32 with the brake disc hub 52. The stationary brake member is provided by a disc 55 attached to the frame 24 and providing a cover for the housing 26. Between the disc 55 and the rotatable brake disc 53 there is located a leather disc 56. The brake parts are normally held in engagement by a spring 60 which is confined between a nut 61 on the threaded end 62 of shaft 32 and a washer 63 which is received by a recess 64 in the left end of brake disc hub 52. Between nut 61 and washer 63 there is located a spacing sleeve 65 less in length than the normal distance between nut 61 and washer 63. The disc 53 is caused to separate from the disc 55 by an electromagnet of which the disc 53 and its hub 52 provide the armature. Hub 52 is guided for horizontal movement by a non-conducting tube 70 supported by a tubular boss 71 of a cup-shaped magnetizable housing 72 which encloses a magnet coil 73 supported by the tube 70 and insulated therefrom. The coil 73 is retained by a washer 74 against which a portion of the housing 72 is staked as indicated at 75. The tubular boss 71 has an opening 76 through which the shaft 32 extends. The nut 61 is protected by a plug 77 screwed into the threaded counter-bore 78 of the brake magnet housing 72. The location of the nut 61 relative to the shaft 32 determines the spacing between the nut 61 and the washer 63 which spacing is greater than the length of the sleeve 65. Therefore, the location of the nut 61 determines how far the brake magnet armature provided by disc 53 will move before the sleeve 65 is contacted both by the washer 63 and by the nut 61. Thus the location of the nut 61 determines the minimum air-gap between the brake disc 53 and the adjacent peripheral portions of the brake magnet housing 72 and also the minimum air-gap between the central boss 71 of the housing 72 and the hub 52 of the brake disc. The adjustment of the nut 61 should be made in order that this gap will be made as small as possible, but without having the armature provided by brake disc 53 and its hub 52 striking any stationary part of the magnetic circuit. The leads of the coil 73 pass through a cable sheath 79 into the chamber 26 which is covered also by a plate 80 having a hole 81 through which wires lead to a current source and to remote control apparatus which may be connected to the servo-motor unit.

At its right end the armature shaft is secured by a pin 90 to a gear 91 which meshes with the gear 92 fixed to a hub 93 having a gear 94 meshing with a gear 95 fixed to a hub 96 providing a gear 97 meshing with a gear 98 fixed to a hub 99 providing a gear 100 meshing with a gear 101 fixed to a hub 102 providing a gear 103 meshing with a gear 104 provided by magnetizable shaft 105 journalled in a non-magnetizable bearing 106 supported by a magnetizable clutch magnet frame 107 and journaled within the inner race of a ball bearing 108 supported by a frame 22. The gear hubs 96 and 102 rotate on a fixed shaft or rod 110 having its right end received within an opening 111 in frame 20 and having its left end integral with a cup-shaped bracket 112 secured by screws 113 to frame 22. The cup-shaped member 112 is cut away at 114 to permit the meshing of gears 91 and 92. The hole 111 in the frame 20 is closed by a plug 115.

The electromagnetically operated clutch comprises a magnetizable frame provided by a ring 120, the disc 107 and the shaft 105. The armature of the electromagnet is provided by the hub 121 of a magnetizable disc 122. The magnetizable ring 120 encloses an annular clutch magnet coil 124 supported by a nonmagnetizable sleeve 123 and insulated therefrom. The leads 124 and 125 of the coil 124 extend out through openings in the enclosing parts as shown in Fig. 1. The magnetizable armature provided by hub 121 and disc 122 slides upon a non-magnetizable shaft 130 which is received by the central bore of the shaft 105 and has its left end portion 131 journaled in a bearing bushing 132 which is supported within the left end of shaft 105. Near its right end the shaft 130 is supported by a bearing sleeve 133 carried by the tubular boss 134 of the plate 21 which covers the right end of the frame 20. Shaft 130 supports a washer 135 and has a splined portion 136 upon which a hub 137 is slidably mounted. Hub 137 has a flange 138 through which pass rivets 139 for securing to the flange a flexible metal disc 140 which carries near its periphery a plurality of equally spaced eyelets 141. Through each eyelet there extends a stud 142 attached to the disc 122. It is therefore apparent that the disc 122 drives the disc 140 through the studs 142 and eyelets 141. Normally the discs 122 and 140 are spaced relatively close together as shown in Fig. 1, this spacing being maintained by a plurality of springs 143 each confined under compression between disc 140 and a washer 144 which is retained by a pin 144a extending through a stud 145 fixed to disc 122. These springs 143 urge the disc 122 toward the right until it engages the washer 135. In this position of disc 122 three equi-distant pins 146 attached to hub 121 are retracted from three of nine equi-distant holes 147 of shaft 105 (Fig. 3). When the clutch magnet coil 124 is connected with a suitable current source, the disc 122 is attracted toward the ring 120, thereby causing the pins 146 to engage the right end of shaft 105 which, then being in a state of rotation, causes certain of the holes 147 to be brought into alignment with the pins 146 so that the left ends of these pins will move into the holes 147 then in registry therewith. In this way, the shaft 105 is connected with the disc 122. Therefore the electric motor is connected with shaft 130 through the speed reducing gearing and through the clutch elements 105 and 146 of a magnetically controlled clutch and through the pins 142 and eyelets 141 and disc 140 connected with hub 137 which is splined at 136 to the shaft 130. When the clutch magnet coil 124 is disconnected from the current source, the springs 143 move the disc 122 toward the right and retract the pins 146 from the shaft 105.

Referring to Fig. 12 it will be seen that the apparatus provides terminals 73x, 37x, 38x and 39x for making connections with different parts of the apparatus and that the apparatus provides terminals 150, 151, 152 and 153 to be connected with the external circuits. Terminal 150 is connected with a wire 150a and with battery 155. Terminal 153 is connected with a switch 156 having a ground return 157 to the battery. Terminals 151 and 152 are connected, respectively, with relays 161 and 162 having electromagnets 163 and 164, respectively, which may be energized in any suitable manner by connecting them with a current source either by a manually operated switch or by some remote control such as operated by radio. The relays 161 and 162 control pairs of contacts 165 and 166, respectively, for connecting wire 150a and battery 155 with the terminals 151 and 152, respectively.

Terminals 151 and 152 are connected with limit switches 167 and 168 respectively, comprising pairs of normally closed contacts 167a and 168a respectively, which are normally engaged and which are separated, respectively, by the engagement with resilient arms 167b and 168b, respectively, of a roller 169 mounted on a stud 170 extending through an arcuate slot 171 in frame 21 and attached to disc 122, see Figs. 1, 10 and 11. Figs. 10 and 11 show different arrangements of the limit switches 167 and 168 with reference to the roller 169. The spacing between the arms 167b and 168b determines the maximum movement of the shaft 130 in either direction and of the arm 148 attached thereto by a key 148b and a clamping screw 148a (Fig. 1).

The limit switches 167 and 168 are connected, respectively, with magnet coils 177 and 178, respectively, of relays 175 and 176. These magnet coils are connected by wires 179 and 180 with the terminal 153. Relays 175 and 176 have similar armatures 181 and 182, respectively, connected with generator brushes 38 and 39, respectively, and normally separated from the magnet cores from the magnet cores 177a and 178c, respectively. Armature 181 carries contacts 183 and 187 adapted to engage contacts 185 and 189, respectively, but normally out of engagement therewith. Contact 187 is insulatingly supported by the armature 181. Armature 181 carries a contact 191 normally engaging a contact 193. Armature 182 carries contacts 184 and 188 adapted to move into engagement with contacts 186 and 190, respectively, but normally out of engagement therewith. Contact 188 is insulatingly supported on armature 182. Armature 182 carries a contact 192 normally engaging a contact 194. Contacts 193 and 194 are connected by wire 195 connected at 37x with the series field coil 37 which is connected through an adjustable resistance 196 with terminal 150. Contacts 187 and 188 are connected by flexible leads 197 and 198, respectively, and by wires 199 and 200, respectively, with a terminal 73x of a brake magnet coil 73 which is connected with wire 150a. Relay contact 189 and 185 are connected by wire 201 with the terminal 153. Relay contacts 186 and 190 are connected by wire 202 with the terminal 153. The shunt field coil 36 and the clutch magnet coil 124 are connected in parallel and with the wire 150a and with wire 202 leading to terminal 153.

When the manual control switch 156 is closed, the shunt field winding 36 and the clutch coil 124 are connected with the battery 155. If the contacts 165 are closed manually or by a remote control acting through the relay magnet coil 163, the magnet coil 177 of relay 175 becomes energized and armature 181 moves downwardly to disconnect contact 191 from contact 193 and to cause the engagement of contacts 183, 185 and 187, 189, thereby causing the brake magnet coil 73 to become energized to release the brake by moving disc 53 (Fig. 1) away from disc 55 and to cause the following armature in series field circuit to be established: ground 157, switch 156, wire 201, contacts 185, 183, relay armature blade 181, brush 38, armature 33, brush 39, relay armature blade 182, contacts 192, 194, wire 195, series field 37, variable resistance 196, terminal 150, battery 155 and ground 157. This circuit causes the electric motor to drive the shaft 130 in a clockwise direction as viewed in Fig. 10 and this motion will continue so long as the contacts 165 remain closed but no longer than the limit switch 167 remains closed, this switch being opened by the engagement of the roller 169 with the blade 167b when said roller moves in a clockwise direction past the position shown in full lines in Fig. 10. When contacts 165 are opened or when limit switch contacts 167a are opened, rotation of the motor in a direction to cause clockwise rotation of shaft 130 ceases since relay 175 is deenergized and armature blade 181 returns to position shown, thereby causing a short circuit of the armature 33 of the electric motor through the wire 195 which connects with the closed pairs of contacts 191, 193 and 192, 194. Separation of contacts 187, 189 causes the brake coil 73 to be deenergized thereby permitting the brake discs 55, 56, 53 to re-engage under the action of spring 60 (Figs. 1 and 2).

When contacts 166 are closed by manual operation or by remote control operating through relay magnet 164, relay 176 becomes energized and armature 182 moves down to separate contact 192 from contact 194 and to effect the engagement of contacts 184, 186 and 188, 190, thereby rendering the brake coil 73 effective to separate the brake discs and thereby completing the following armature and series field circuit of the electric motor: ground 157, switch 156, terminal 153, wire 202, contacts 186 and 184, blade 182, brush 39, motor armature 33, brush 38, blade 181, contacts 191 and 193, wire 195, series field 37, variable resistance 196, terminal 150, battery 155, ground return 157. Since the direction of current through the armature is now reversed, the armature will turn in such direction as to cause the shaft 130 to move counterclockwise. Such rotation of shaft 130 will continue so long as contacts 166 are closed, but no longer than limit switch 168 remains closed. Limit switch 168 will be opened when the roller 169 moves to the right of the position 169b (Fig. 10). The separation of either pairs of contacts 166, 168a will cause the deenergization of relay 176 and the circuits will return to normal status shown in Fig. 12, thereby short circuiting the armature 33 and rendering the brake magnet coil 73 ineffective to maintain the brake discs out of engagement. The motor M will be stopped by dynamic braking due chiefly to short circuiting of the armature and, to some extent, by the engagement of the brake discs by the action of spring 60. The brake operates to prevent drifting of the operating arm 48 while the motor is not operating.

For certain applications of the servo-motor unit it has been found that frictional resistance is sufficient to prevent drifting of the operating arm. Therefore the electro-magnetically controlled brake can be omitted. When the brake coil is omitted, the diagram of circuits will be as shown in Fig. 13.

The relays 175 and 176 are mounted upon a bracket 210 secured by screws 211 to a bracket 212 which is supported by a flat surface 213 provided by the housing 20. The limit switches and relays are enclosed by sheet metal shield members 220a and 220b attached to the frame wall 21 to the bracket 212 in any suitable manner. A tube 222 connects the space 223 within the shield 220 with the space 26 within the frame 24; and the tube 222 provides a housing for any wires which may be used to connect the relays, limit switches and clutch magnet coil 124 with the various terminals according to the diagram, said terminals being located within the compartment 26. The terminals 73x, 37x, 38x and 39x for interconnecting the parts of the unitary structure and the terminals 150, 151, 152 and 153 for making external connection with the current source and control switches may be arranged as shown in Fig. 5.

While the embodiment of the present invention as herein disclosed, constitutes a preferred form, it is to be understood that other forms might be adopted, all coming within the scope of the claims which follow.

What is claimed is as follows:

1. The combination with an electric motor, of a driven shaft; speed reducing gears driven by the motor; two discs, one anchored to the shaft, the second slidably mounted on the shaft; means anchored to the one disc and engaging the other disc to cause their concurrent rotation and permitting the second disc to slide toward and away from the first disc; means on the second disc engageable with a speed reducing gear to connect the motor with the shaft; and an electromagnet, energizable for moving the second disc away from the first and into engagement with a speed reducing gear.

2. The combination with an electric motor, of a member to be rotated thereby; speed reducing gearing operatively connecting the motor with said member; a shaft upon which said member is journalled; two discs, the first anchored to the shaft, the second slidable on the shaft and having means engageable with said member when said second disc is moved away from the first; means yieldably urging the second disc toward the first and out of engagement with said member; and electromagnet means, energizable with the electric motor, for moving the second disc into driven engagement with said member.

3. The combination with an electric motor, of a member to be rotated thereby; speed reducing gearing connecting the motor with said member; a shaft upon which said member is journalled; two discs, the first anchored to, the second slidably on said shaft; pins anchored to one of said discs and slidably extending through holes in the other disc, certain of said pins having springs normally urging the discs toward each other; means on the slidable disc engageable with the member for connecting the motor with the shaft; and an electromagnet, energizable to attract and move the slidable disc away from the other disc and into operative engagement with the member.

ROBERT H. HILL.

REFERENCES CITED

The following references are of record in the file of this patent:

UNITED STATES PATENTS

| Number | Name | Date |
|---|---|---|
| 1,993,413 | Mellon | Mar. 5, 1935 |
| 1,736,401 | Harwood | Nov. 19, 1929 |
| 2,037,780 | Gross | Apr. 21, 1936 |
| 1,245,532 | Townsend et al. | Nov. 6, 1917 |
| 1,668,880 | Vallen | May 8, 1928 |
| 1,678,945 | Jones | July 31, 1928 |
| 1,926,478 | Erwin | Sept. 12, 1933 |
| 2,314,019 | Shaw | Mar. 16, 1943 |
| 2,267,114 | Lear et al. | Dec. 23, 1941 |
| 2,214,807 | Buckley | Sept. 17, 1940 |
| 2,354,854 | Doll | Aug. 1, 1944 |